United States Patent
Spicer et al.

(10) Patent No.: US 7,452,495 B2
(45) Date of Patent: Nov. 18, 2008

(54) MOLDING-SYSTEM PLATEN

(75) Inventors: Kevin Allan Spicer, Bolton (CA); Peter Adrian Looije, Newmarket (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 294 days.

(21) Appl. No.: 11/406,430

(22) Filed: Apr. 19, 2006

(65) Prior Publication Data

US 2007/0246860 A1    Oct. 25, 2007

(51) Int. Cl.
   *B29C 45/17* (2006.01)
(52) U.S. Cl. ............... 264/328.1; 425/472; 425/595
(58) Field of Classification Search ........... 425/472, 425/595, 451.9; 264/299, 319, 328.1
   See application file for complete search history.

(56) References Cited

U.S. PATENT DOCUMENTS

| | | | |
|---|---|---|---|
| 4,571,169 A | | 2/1986 | Shima et al. |
| 4,613,475 A | * | 9/1986 | Hettinga ............... 264/328.1 |
| 5,123,834 A | * | 6/1992 | Joyner ................. 425/592 |
| 6,027,329 A | * | 2/2000 | Nazarian et al. ........ 425/451.9 |
| 6,439,876 B1 | | 8/2002 | Glaesener |
| D472,566 S | | 4/2003 | Okada |
| 6,776,605 B2 | * | 8/2004 | Becker et al. ............ 425/595 |
| 6,984,121 B2 | | 1/2006 | Fischbach et al. |
| 7,048,535 B2 | * | 5/2006 | Takanohashi ............ 425/472 |
| 7,080,978 B2 | * | 7/2006 | Glaesener ............... 425/472 |
| 2007/0187871 A1 | * | 8/2007 | Nagata et al. ........... 264/328.1 |

FOREIGN PATENT DOCUMENTS

WO  WO 2005/084909 A1    9/2005

* cited by examiner

*Primary Examiner*—James Mackey

(57) ABSTRACT

Disclosed is a molding-system platen, comprising a mold-support face being configured to support a mold, the mold-support face including a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face; a border surrounding the mold-support face, and a width of the border extending from an outer edge of the mold-support face toward the outer edge of the force-receiving face; an upstanding wall extending posterior of the mold-support face; and a peripheral wall extending around a periphery of the mold-support face; and a canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

21 Claims, 6 Drawing Sheets

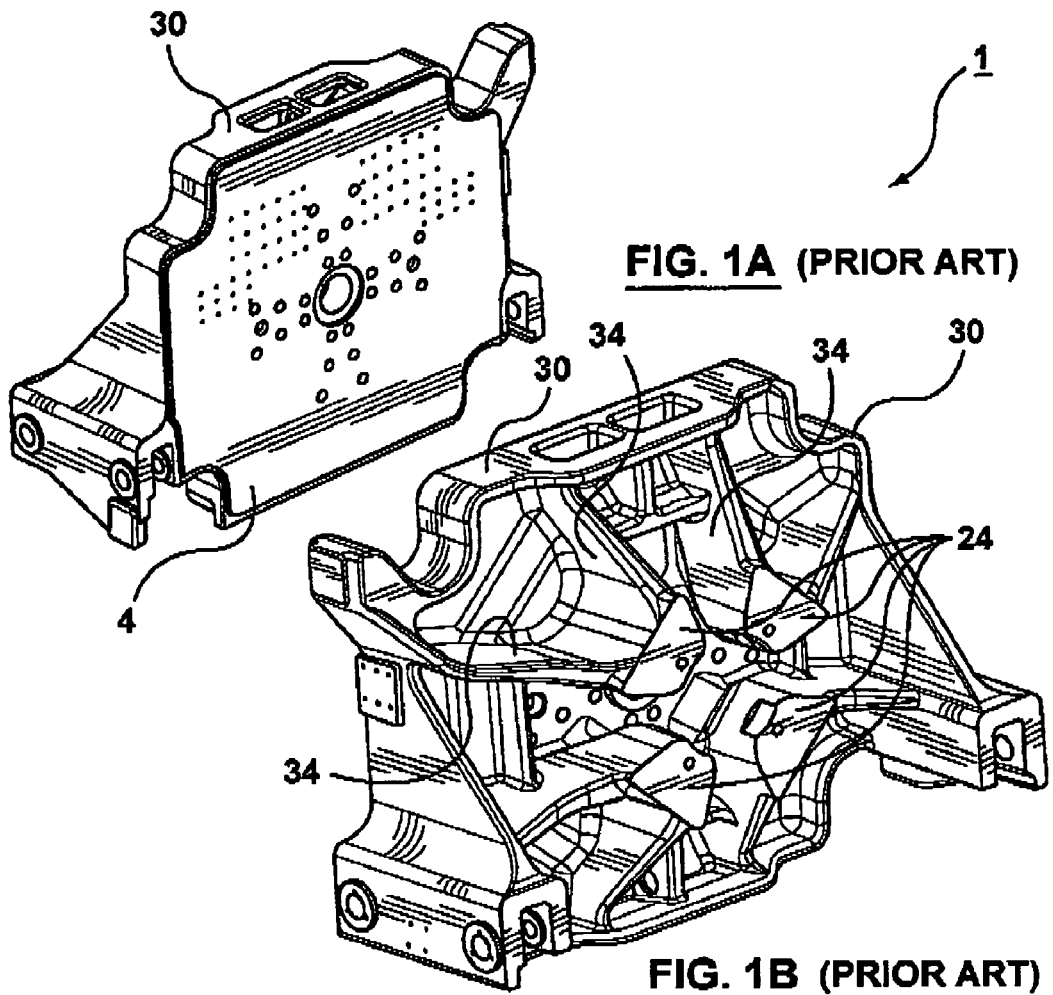
FIG. 1A (PRIOR ART)
FIG. 1B (PRIOR ART)
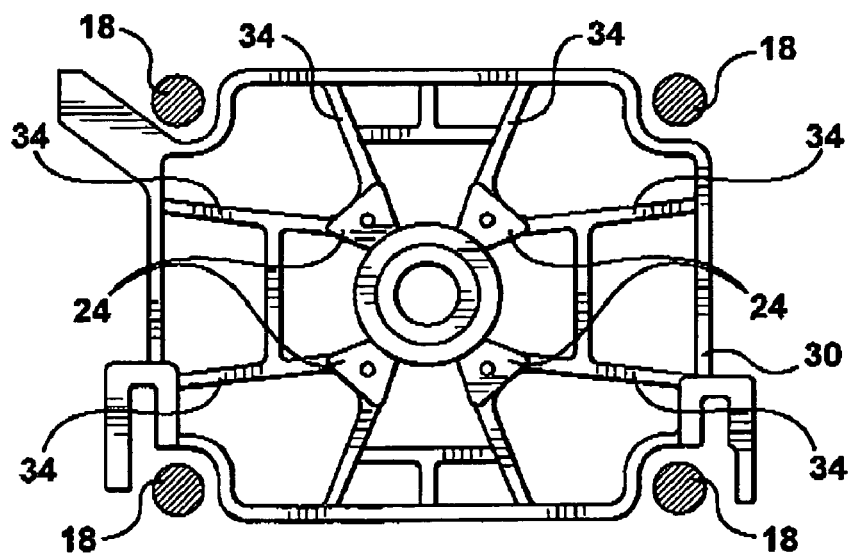
FIG. 1C (PRIOR ART)

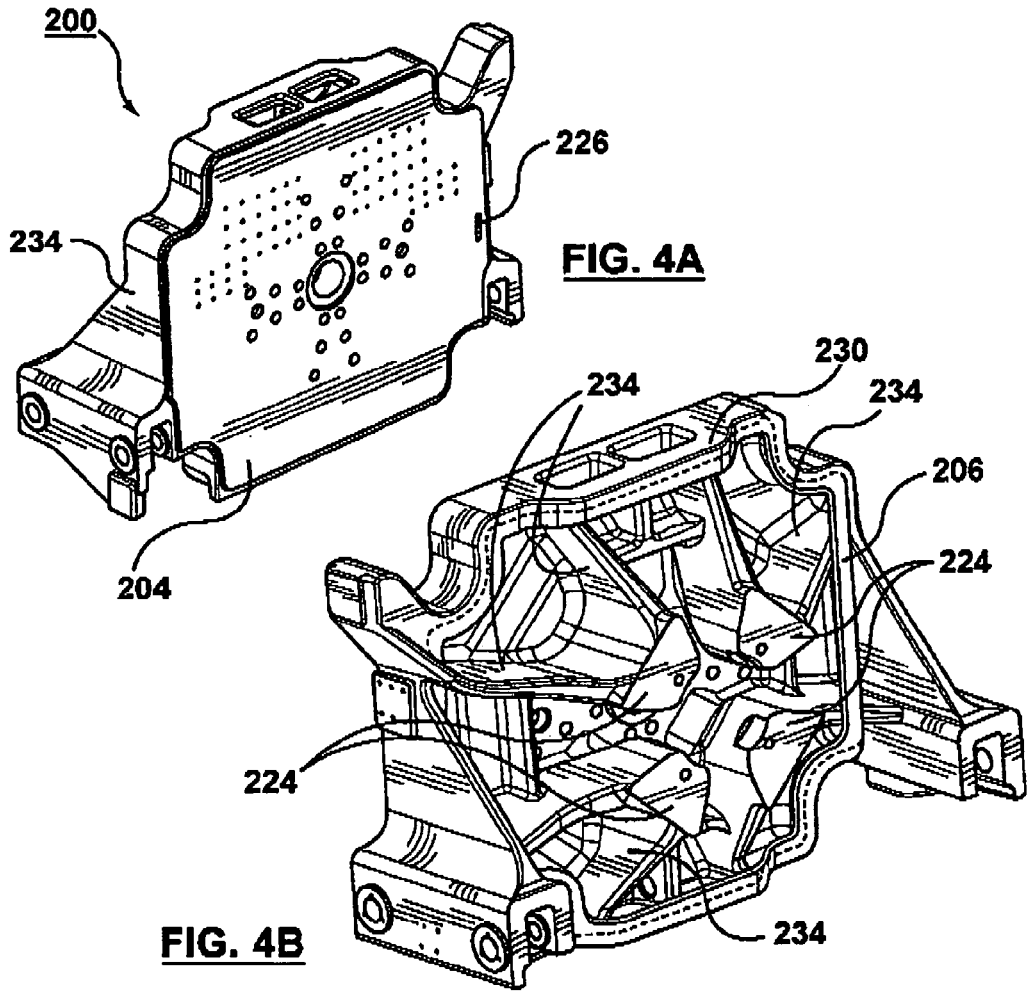
FIG. 4A
FIG. 4B
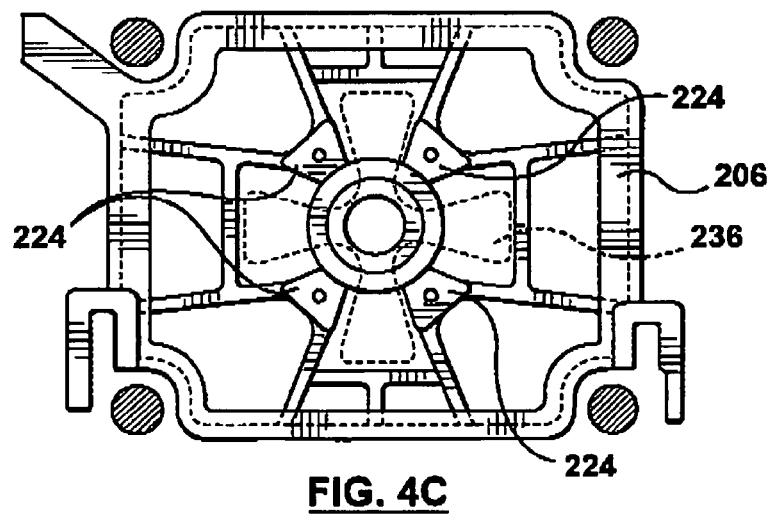
FIG. 4C

MOLDING-SYSTEM PLATEN

TECHNICAL FIELD

The present invention generally relates to, but is not limited to, molding-systems, and more specifically the present invention relates to, but is not limited to, molding-system platens, and/or to molding systems having molding-system platens, and or to methods of molding-system platens.

BACKGROUND

PCT Patent Application Number 05/084909A1 (Inventor: Nagata, Yoshihiko; Published: 2005-09-15) appears to disclose a mold-support device for an injection-molding system.

U.S. Design Pat. No. 472,566 (Inventor: Okada, Norihito; Published: 2003-04-01) appears to disclose a platen of a molding system.

U.S. Pat. No. 6,984,121 (Inventor: Fischbach, Gunther et al; Published: 2006-01-10) appears to disclose a platen for an injection-molding machine.

U.S. Pat. No. 6,746,232 (Inventor: Becker et al; Published: 2004-06-08) appears to disclose a platen for an injection-molding machine, in which the platen includes flexible connectors at the corners to support bushes for tie bars.

U.S. Pat. No. 6,439,876 (Inventor: Glaesener, Pierre; Published 2002-08-27; Assignee: Husky Injection Molding Systems Limited) appears to disclose a mold-support platen of a molding system.

FIGS. 1A, 1B and 1C provide views of a platen 1 according to U.S. Pat. No. 6,439,876. The top-most image is a perspective-frontal view of the platen 1. The lower-most image is an end view of the platen 1. The image between the top-most and bottom-most images is a perspective-rearward view of the platen 1. The platen 1 includes a mold-support face 4 (hereafter referred to as the "face 4"). A peripheral wall 30 extends rearward of the face 4. The face 4 includes force-receiving faces 24 extending posterior of the face 4. The face 4 has clearances for tie bars 18 at the four corners of the face 4. Walls 34 extend rearward from the face 4.

FIGS. 2A and 2B are cross-sectional views of the platen 1 of FIG. 1A. The platen 1 is used in a molding system 2. The face 4 supports a mold 8 that includes mold halves. One of the mold halves is attachable to the face 4, while the other of the mold halves is attachable to a stationary platen 10. An injection unit 12 is used to process a molding material that is to be injected into a cavity defined by the mold 8. A clamping block 14 includes clamping mechanisms used to actuatably move a clamp column 16 attached to the platen 1 so that the platen 1 is movable away from and toward the stationary platen 10 so that the mold 8 may be closed and opened. The clamping block 14 is known to those skilled in the art of molding machinery and thus the clamping block 14 will not be discussed. The tie bars 18 attach the stationary platen 10 with the clamping block 14 so that a clamping force may be applied to the mold 8. The force-receiving face 24 is offset rearward from the face 4 so that a clamping force that is applied to the platen 1 is divergently transmitted from the force-receiving face 24 across the face 4. The force-receiving face 24 is smaller than the face 4. A border 26 surrounds the face 4. The width of the border 26 extends from the outer edge of the face 4 toward the outer edge of the force-receiving face 24. For some implementations, the footprint of the force-receiving face 24 is approximately equal to the footprint of the clamp column 16. However, the footprint of the force-receiving face 24 is depicted as larger than the footprint of the clamp column 16.

The clamp column 16 is a force-acting area or structure in that the clamping force is transmitted through the clamp column 16 to the mold 8. The footprint of the mold 8 is larger than the footprint of the clamp column 16 such that a portion of the mold 8 extends from a central portion of the face 4 and into the border 26. Upon application of a clamping force, the border 26 becomes warped (that is, the border 26 is bend toward the clamping block 14), and as a result the portion of the mold 8 that is connected to the border 26 will open and thus it will experience inadvertent flashing during injection of the molding material into the mold 8. This is a problematic condition.

FIG. 2B is a side view of the platen 1 of FIG. 2A in which a clamping force is applied to the mold 8. The clamping force is generated by the clamping block 14. The generated clamping force includes a first-force component 20 and a second-force component 22 that are equal to each other in magnitude but applied opposite to each other across the mold 8. The first-force component 20 is transmitted to the mold 8 along a pathway that extends from the clamping block 14 through the tie bars 18 into the stationary platen 10 and to the mold 8. The second-force component 22 is transmitted along a pathway that extends from the clamping block 14 through the clamp column 16 and into the platen 1 and then to the mold 8.

A Central portion of the face 4 is positioned within the footprint of the clamp column 16, and the central portion of the face 4 does not warp or bend when the second force-component 22 is applied to the mold 8. However, the force component 22 is transmitted divergently across the border 26, and as such (disadvantageously) the border 26 becomes warped by the force component 22. When the border 26 becomes warped, the mold 8 will flash (that is, molding material will inadvertently leak out from the mold 8 during injection of the molding material). The border 26 bends back toward the clamping block 14 (because the force component 22 is unequally distributed (or diluted) across the border 26). Since not as much of the force component 22 reaches the border 26, the border 26 does not get pushed as much as, for example, the central portion of the face 4.

Therefore, in order to counter act backward bending of the border 26, persons skilled in the art may consider the following option: apply a higher clamp force (tonnage) via the column 16 in order to keep the mold-support faces of the platen 1, 10 parallel with each other. However, a negative consequence may occur, amongst other things, as a result of the foregoing option (which may not completely motivate the person skilled in the art away from the option): if the clamping force is increased, more energy would be required to generate and apply the clamping force to the platen 1 and thus the molding system 2 may be more expensive to operate.

SUMMARY

According to a first aspect of the present invention, there is provided a molding-system platen, comprising a mold-support face being configured to support a mold, the mold-support face including a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face; a border surrounding the mold-support face, and a width of the border extending from an outer edge of the mold-support face toward the outer edge of the force-receiving face; an upstanding wall extending posterior of the mold-support face; and a peripheral wall extending around a periphery of the mold-support face; and a canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

According to a second aspect of the present invention, there is provided a molding system, comprising: a molding-system platen, including: a mold-support face being configured to support a mold, the mold-support face including: a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face; a border surrounding the mold-support face, and a width of the border extending from an outer edge of the mold-support face toward the outer edge of the force-receiving face; an upstanding wall extending posterior of the mold-support face; and a peripheral wall extending around a periphery of the mold-support face; and a canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the Canopy attaching with the upstanding wall.

According to a third aspect of the present invention, there is provided a method of a molding-system platen, the method including linking to and stiffening a face with a canopy, the mold-support face being configured to Support a mold, the mold-support face including: a frustum-shaved structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face; a border surrounding the mold-support face, and a width of the border extending from an outer edge of the mold-support face toward the outer edge of the force-receiving face; an upstanding wall extending posterior of the mold-support face; and a peripheral wall extending around a periphery of the mold-support face; and the canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

A technical effect of the present invention is to mitigate the disadvantages associated with known molding-system platens (at least in part) as will become apparent in view of the description of the exemplary embodiments provided below.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which:

FIGS. 1A, 1B and 1C provide views of a platen according to U.S. Pat. No. 6,439,876;

FIGS. 4A to 4C are perspective views of a molding-system platen according to a second exemplary embodiment;

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 3A:
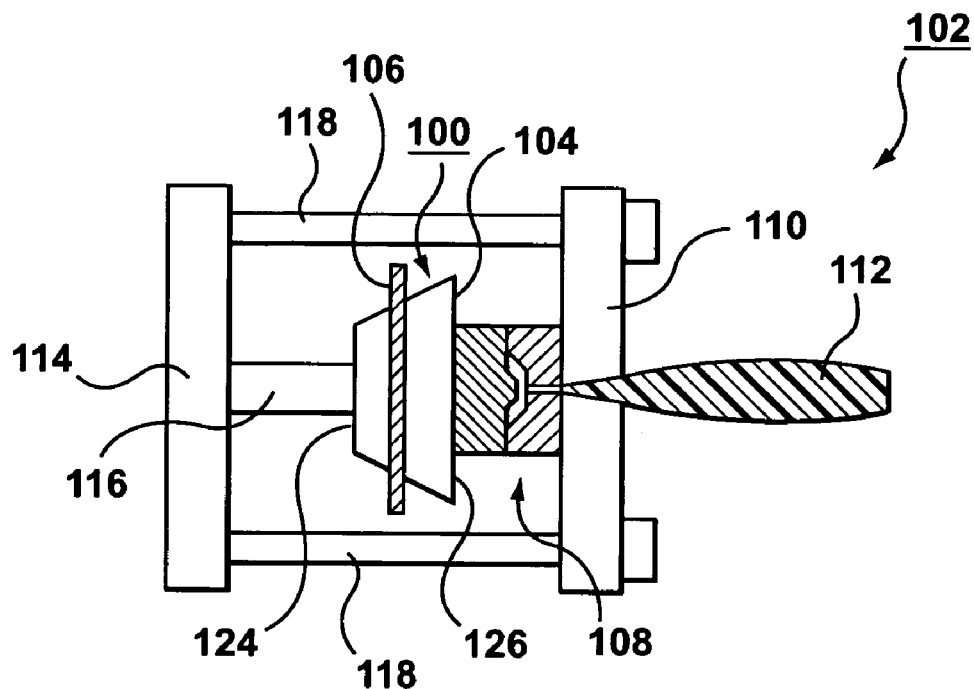
FIGS. 3A and 3B are side views of a molding-system platen according to a first exemplary embodiment.
Figure 3B:
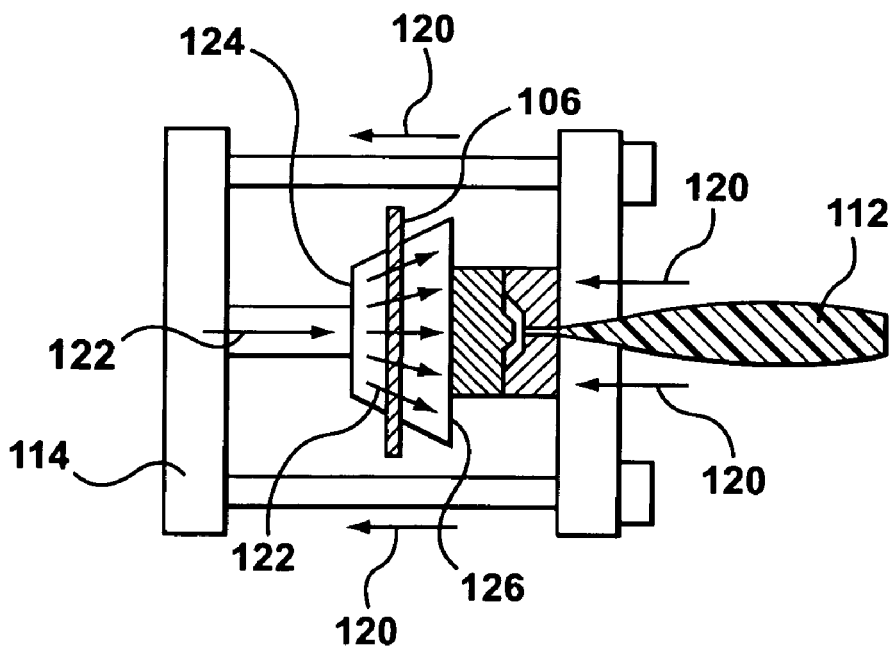

FIGS. 3A and 3B are side views of a molding-system platen 100 (hereafter referred to as the "platen 100") according to the first exemplary embodiment. The platen 100 is used in a molding system 102 which may be supplied separately from (or supplied with) the platen 100. In FIG. 3A, a clamping force is not applied to the platen 100 while in FIG. 3B the clamping force is applied to the platen 100.

The platen 100 includes a mold-support face 104, and also includes a canopy 106 linking to, and stiffening, the mold-support face 104 (hereafter referred to as "the face 104").

According to a variation, the face 104 includes a border 126, and the canopy 106 stiffens the border 126.

The face 104 is configured to support a mold (such as a mold 108). The platen 100 also includes the canopy 106 that is linked to the face 104, and the canopy 106 stiffens the face 104.

The mold 108 is sold separately from the platen 100. The canopy 106 is a covering (or a layer, or a roof-like projection) that is suspended over the face 104.

The molding system 102 uses the mold 108. The mold 108 has mold halves, in which one of the mold halves is attachable to the face 104, while the other of the mold halves is attachable to a stationary platen 110. An injection unit 112 is used to process a molding material that is to be injected into a cavity defined by the mold 108. A clamping block 114 includes clamping mechanisms used to actuatably move a clamp column 116 that is attached to the platen 100, so that the platen 100 may be moved away from and toward the stationary platen 110, so that the mold 108 may be opened and closed accordingly. The clamping block 114 is known to those skilled in the art of molding machinery and thus details of the clamping block 114 will not be described. Tie bars 118 attach the stationary platen 110 to the clamping block 114 so that a clamping force (generated by the block 114) may be applied to the mold 108. The face 104 includes a force-receiving face 124 that is offset rearward from the face 104 so that the clamping force applied to the platen 100 may be divergently transmitted from the force-receiving face 124 across the face 104. The force-receiving face 124 is smaller than the face 104. The canopy 106 is positioned between the face 104 and the force-receiving face 124.

A border 126 surrounds the face 104. The width of the border 126 extends from the outer edge of the face 104 toward the outer edge of the force-receiving face 124. The footprint of the force-receiving face 124 is larger than the footprint of the clamp column 116. According to a variation, the footprint of the force-receiving face 124 is approximately the same size as the footprint of the clamp column 116. The clamp column 116 is a force-acting area or structure in that the clamping force is transmitted through the clamp column 116 into the platen 100 and over to the mold 108. The face 104 includes a force-receiving face 124 offset rearward from the face 104.

FIG. 3B is a side view of the platen 100 of FIG. 3A in which a clamping force is applied to the mold 108. The clamping force has two force components which are: a first-force component 120 and a second-force component 122 that are equal to each other in magnitude but applied opposite to each other across the mold 108. The first-force component 120 is transmitted to the mold 108 along a pathway that extends from the clamping block 114, through the tie bars 118 into the stationary platen 110 and to the mold 108. The second force component 122 is transmitted along a pathway that extends form the clamping block 114 through the clamp column 116 into the platen 100 and then to the mold 108.

Figure 2A:
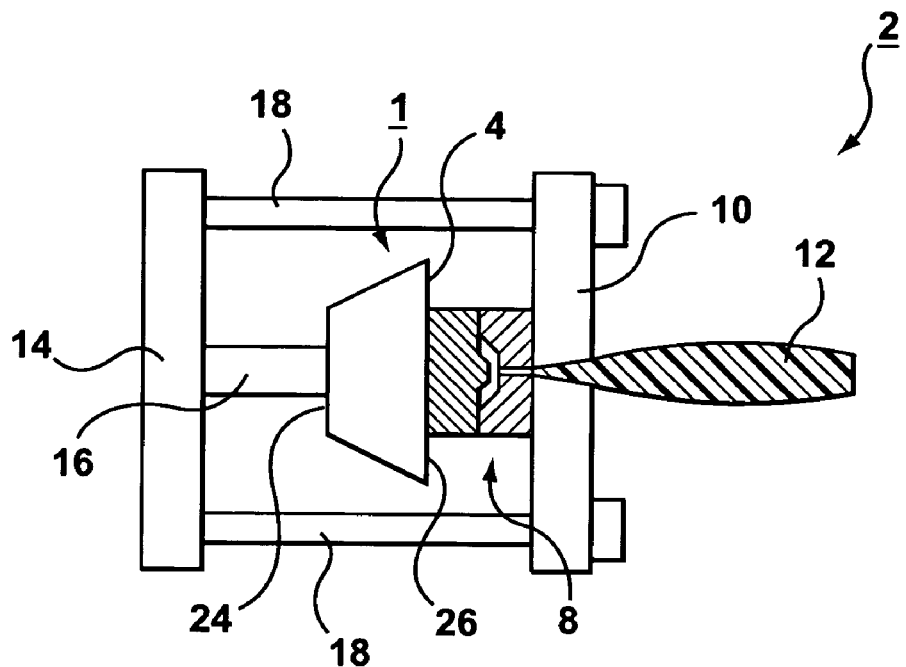
FIGS. 2A and 2B are cross-sectional views of the platen of FIG. 1A.
Figure 2B:
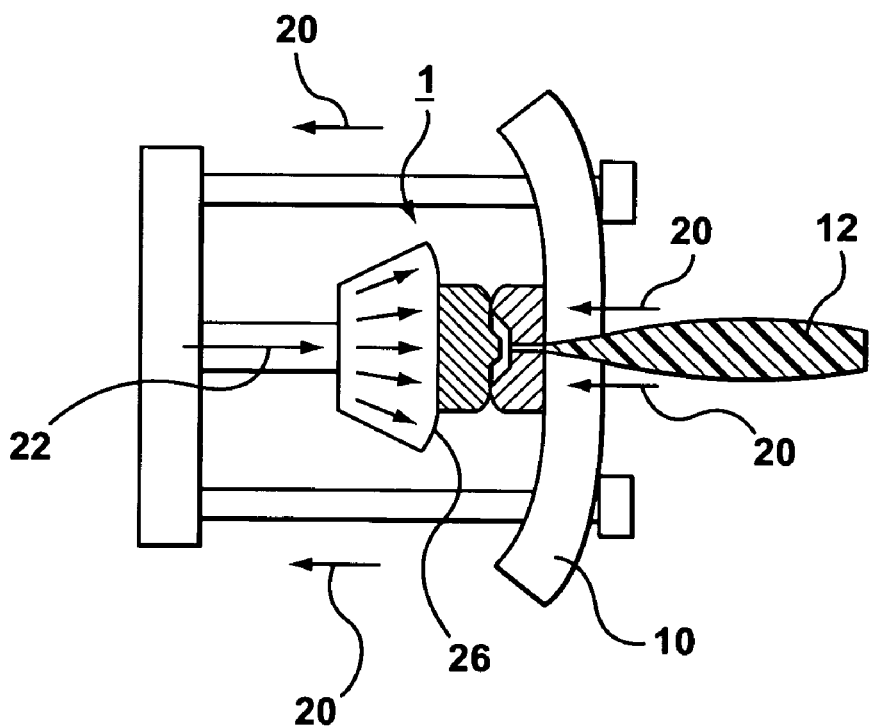

The technical effect of the arrangement of the platen 100, amongst other things, is That a lower clamp force may be applied to the mold 108. The clamping force is also called "tonnage". The clamp force applied to the platen 100 is lower in comparison to the clamp force applied to the platen 1 of FIGS. 1, 2A, 2B (in which the platen 1 does not include a canopy). The canopy 106 increases stiffening of the face 104 so that a lower clamping force may be applied to the mold 108. While the canopy 106 adds some weight to the platen 100, the canopy 106 adds just enough to obtain the required amount of stiffening of the face 104 without unnecessarily increasing the inertia of the platen 100 to the point where the cycle time of the molding system 102 is reduced too much. It was determined that deflections associated with the platen 100 approximate closely to the deflections associated with the (known) platen 1. It may be possible to construct platen 100 to have less weight than the platen 1 of FIG. 1A and so the efficiency of the platen 100 is improved in terms of a weight-to-deflection ratio.

Another technical advantage, amongst other things, of the platen 100 is that the canopy 106 stiffens the border 126 sufficiently enough so that the mold 108 avoids experiencing flashing when a lower clamping force is applied to the mold 108.

Another technical advantage, amongst other things, of the platen 100 is that the canopy 106 permits thinner walls to extend from the face 104.

Referring to FIGS. 3A and 3B, preferably the force-receiving face 124 is offset rearward from the face 104. The force-receiving face 124 is configured to receive a force (such as a clamping force) from a force-imparting structure (such as a clamp column 116 working in cooperation with the clamping block 114). The canopy 106 is positioned offset rearward proximate of the border 126. The border 126 surrounds the face 104. The canopy 106 is preferably offset sufficiently enough from the face 104 to substantially suppress deflection of the border 126 responsive to a force (such as a clamping force) that acts to deflect the border 126.

Another technical effect is that the faces 104 and 124 may be placed closer together, thereby permitting the platen 100 to be smaller.

The foregoing description of the first exemplary embodiment is equally applicable to the other exemplary embodiments.

FIGS. 4A to 4C are perspective views of a molding-system platen 200 (hereafter referred to as the "platen 200") according to the second exemplary embodiment. To facilitate an understanding of the second exemplary embodiment, elements of the second exemplary embodiment (that are similar to those of the first exemplary embodiment) are identified by reference numerals that use a two-hundred designation rather than a one-hundred designation (as used in the first embodiment). For example, the canopy of the second exemplary embodiment is labeled 206 rather than being labeled 106.

The platen 200 includes a mold-support face 204, and also includes a canopy 206 that links to and stiffens the mold-support face 204. The canopy 206 is C-shaped or open-sided. Preferably, the canopy 206 stiffens a border 226 that surrounds the mold-support face 204. The border 226 is a strip of area that surrounds the mold-support face 204. The canopy 206 links to a posterior of the mold-support face 204. The mold-support face 204 has a force-receiving face 224. The canopy 206 increases (improves) a moment of inertia of the border 226 sufficiently enough to substantially suppress deflection of the border 228 responsive to a force acting (via a force-receiving face 224) to deflect or warp the border 226. The mold-support face 204 includes a force-receiving face 224 offset rearward from the mold-support face 204. The canopy 206 has a planar surface that is sufficiently large enough to substantially suppress deflection of a border of the mold-support surface responsive to a force acting to deflect the border 226. The canopy 206 is substantially symmetrically linked to the mold-support face 204 sufficiently enough to substantially suppress deflection of the border 226 responsive to a force acting to deflect the border 226. The force-receiving face 224 includes at least one pedestal (depicted are four pedestals) that is centrally positioned relative to the mold-support face 204, and the pedestal is offset rearward of the mold-support face 204.

The mold-support face 204 includes a base of a fruits-shaped structure having a pedestal, and the pedestal defines the force-receiving face 224 that is offset rearward from the mold-support face 204. According to a variant, the fruits-shaped structure is conical shaped. According to another variant, the fruits-shaped structure is pyramid shaped.

According to the second exemplary embodiment, the mold-support face 204 includes an upstanding wall 234 that extends posterior of the mold-support face 204, and the canopy 206 is attached to the upstanding wall 234. Peripheral wall 230 extends around the periphery of the face 204, and the canopy 206 attaches the peripheral wall 230 as well as to a portion of the upstanding wall 234. The upstanding wall 234 links the canopy 206 to the mold-support face 204. According to a variant, the upstanding wall 234 is a peripheral wall that extends from the periphery of the mold-support face 204. According to another variant, the upstanding wall 234 is a wall that extends from the force-receiving face 224 and radially out toward the peripheral wall. The foregoing description of the second exemplary embodiment is equally applicable to the other exemplary embodiments. It is within the scope of upstanding wall 234 to include a upstanding post or more than one upstanding post.

Referring to FIG. 4C, the canopy 206 covers, in effect half of the mold-support face 204. In this exemplary embodiment, an ejector plate 236 is used so that the canopy 206 does not interfere with operation and/or servicing of the ejector plate. The ejector plate 236 is optional. According to another variant, the ejector plate 236 is not used and the canopy 206 extends toward the force-receiving faces 224.

Figure 5A:
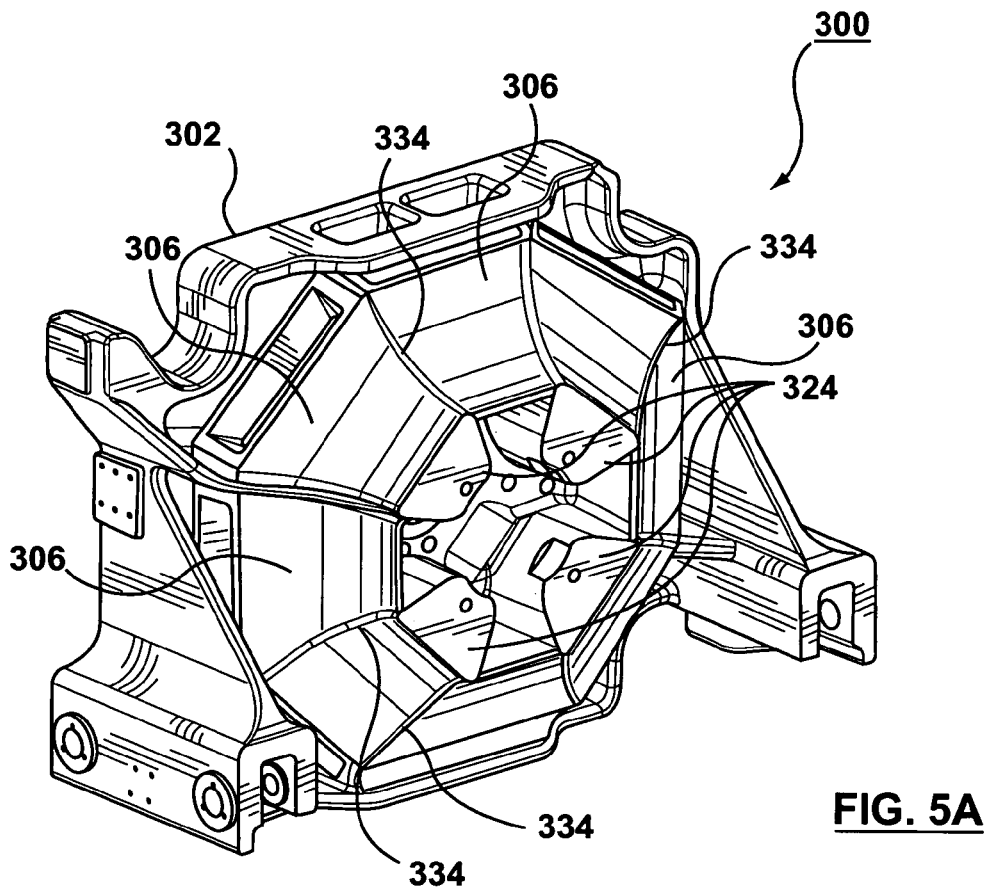
FIGS. 5A and 5B are perspective views of a molding-system platen according to a third exemplary embodiment.
Figure 5B:
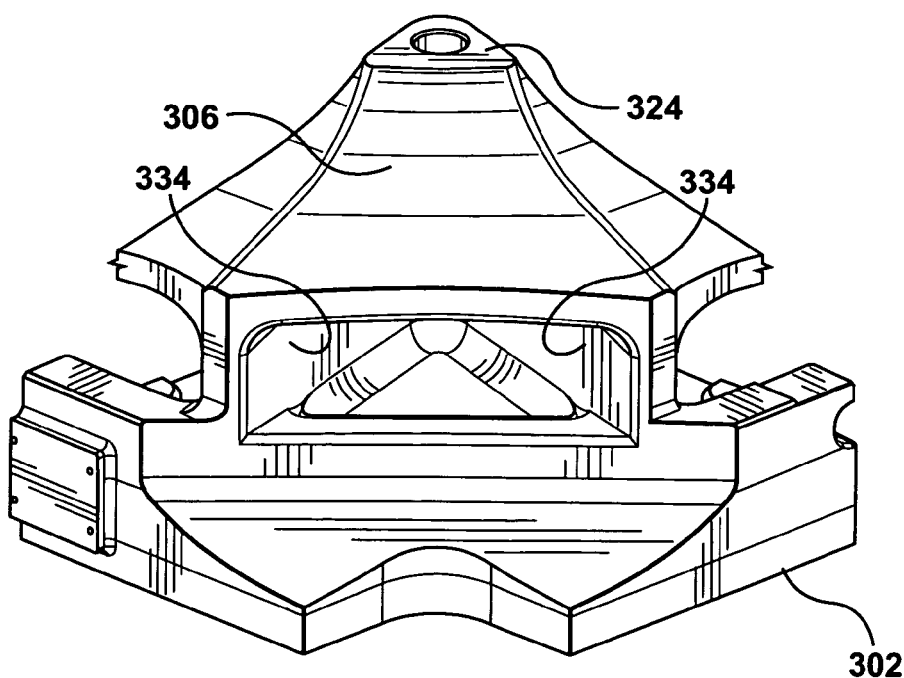
Figure 6A:
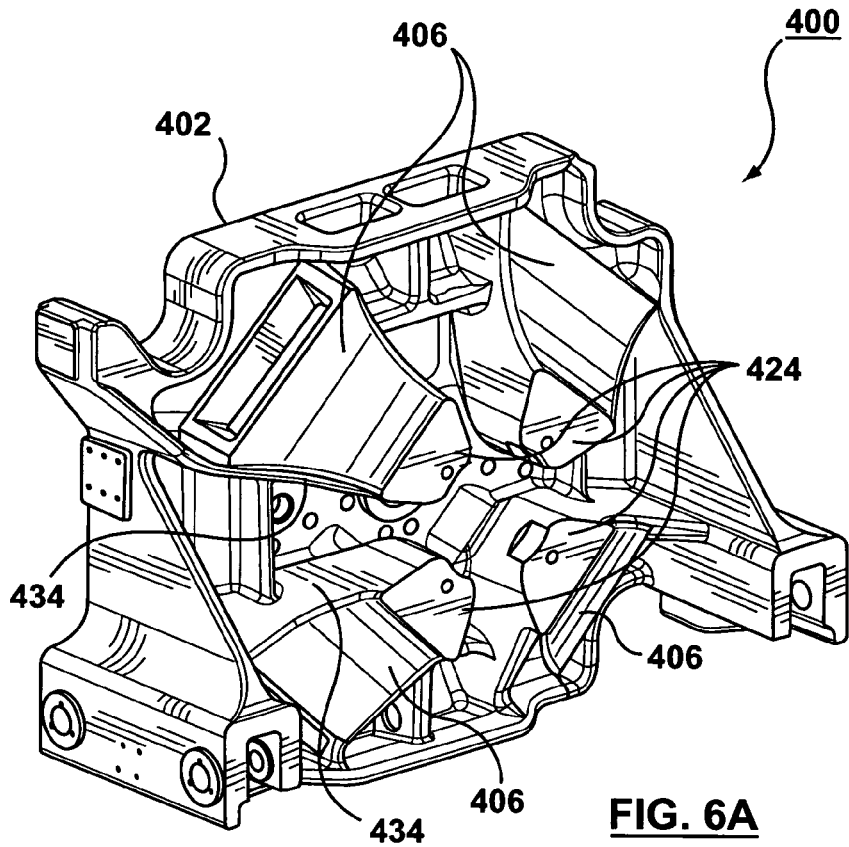
FIGS. 6A and 6B are perspective views of a molding-system platen according to a fourth exemplary embodiment.
Figure 6B:
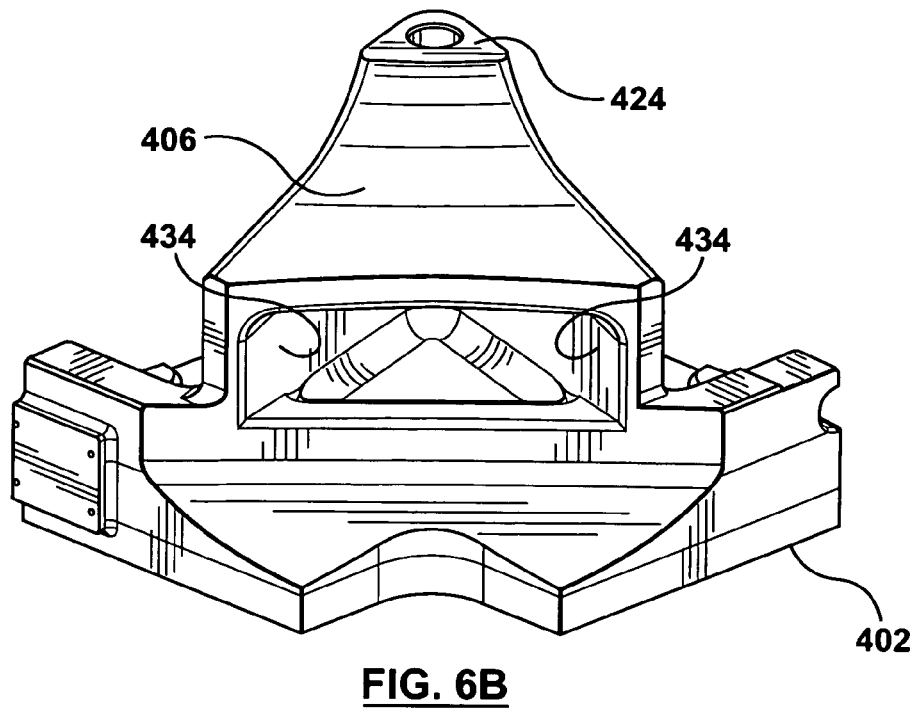

FIGS. 5A and 5B are perspective views of a molding-system platen 300 (hereafter referred to as "the platen 300")

according to the third exemplary embodiment. To facilitate an understanding of the third exemplary embodiment, elements of the third exemplary embodiment (that are similar to those of the first exemplary embodiment) are identified by reference numerals that use a three-hundred designation rather than. Ea one-hundred designation (as used in the first exemplary embodiment). For example, the canopy of the third exemplary embodiment is labeled 306 rather than being labeled 106.

The platen 300 includes a mold-support face 304, and also includes a canopy 306 that links to and stiffens the mold-support face 304. The canopy 306 includes a plurality of canopies (306) that each extend between walls 334, and they form in effect a single canopy that substantially extends and covers the posterior of the mold-support face 304. In this exemplary embodiment, an ejector plate is not used so that the canopy 306 may cover the entire posterior of the mold-support face 302. The foregoing description of the third exemplary embodiment is equally applicable to the other exemplary embodiments.

Band 6B are perspective views of a molding-system platen 400 (hereafter referred to as "the platen 400") according to the fourth exemplary embodiment. To facilitate an understanding of the fourth exemplary embodiment, elements of the fourth exemplary embodiment (that are similar to those of the first exemplary embodiment) are identified by reference numerals that use a four-hundred designation rather than a one-hundred designation (as used in the first embodiment). For example, the canopy of the fourth exemplary embodiment is labeled 406 rather than being labeled 106.

The platen 400 includes a mold-support face 404, and also includes a canopy 406 that links to and stiffens the mold-support face 402. The canopy 406 includes a plurality of canopies that each extend between walls 434 in an alternating manner or pattern. The canopy 406 covers, in effect, half of the mold-support face 404. In this exemplary embodiment, an ejector plate is used and the canopy 406 does not interfere with operation and/or servicing of the ejector plate (not depicted). The foregoing description of the fourth exemplary embodiment is equally applicable to the other exemplary embodiments.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:
1. A molding-system platen, comprising:
a mold-support face being configured to support a mold, the mold-support face including:
a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face;
a border surrounding the mold-support face, and a width of the border extending from an outer edge of the mold-support face toward the outer edge of the force-receiving face;
an upstanding wall extending posterior of the mold-support face; and
a peripheral wall extending around a periphery of the mold-support face; and
a canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

2. The molding-system platen of claim 1, wherein:
the canopy links to a posterior of the mold-support face.

3. The molding-system platen of claim 1, wherein:
the canopy improves a moment of inertia of the mold-support face sufficiently enough to substantially suppress deflection of the mold-support face responsive to a force acting to deflect the mold-support face.

4. The molding-system platen of claim 1, wherein:
the canopy is positioned offset rearward proximate of the mold-support face sufficiently enough to substantially suppress deflection of the mold-support face responsive to a force acting to deflect the mold-support face.

5. The molding-system platen of claim 1, wherein:
the canopy has a planar surface, the planar surface is sufficiently large enough to substantially suppress deflection of the mold-support face responsive to a force acting to deflect the mold-support face.

6. The molding-system platen of claim 1, wherein:
the canopy has a mass, and the mass is substantial enough to suppress deflection of the mold-support face responsive to a force acting to deflect the mold-support face.

7. The molding-system platen of claim 1, wherein:
the canopy is substantially symmetrically linked to the mold-support face sufficiently enough to substantially suppress deflection of the mold-support face responsive to a force acting to deflect the mold-support face.

8. A molding system, comprising:
a molding-system platen, including:
a mold-support face being configured to support a mold, the mold-support face including:
a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face;
a border surrounding the mold-support face, and a width of the border extending from an outer edge of the mold-support face toward the outer edge of the force-receiving face;
an upstanding wall extending posterior of the mold-support face; and
a peripheral wall extending around a periphery of the mold-support face; and
a canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

9. The molding system of claim 8, wherein:
the canopy links to a posterior of the mold-support face.

10. The molding system of claim 8, wherein:
the canopy improves a moment of inertia of the mold-support face sufficiently enough to substantially suppress deflection of the mold-support face responsive to a force acting to deflect the mold-support face.

11. The molding system of claim 8, wherein:
the canopy is positioned offset rearward proximate of the mold-support face sufficiently enough to substantially suppress deflection of the mold-support face responsive to a force acting to deflect the mold-support face.

12. The molding system of claim 8, wherein:
the canopy has a planar surface, the planar surface is sufficiently large enough to substantially suppress deflection of the mold-support face responsive to a force acting to deflect the mold-support face.

13. The molding system of claim 8, wherein:
the canopy has a mass, and the mass is substantial enough to suppress deflection of the mold-support face responsive to a force acting to deflect the mold-support face.

14. The molding system of claim 8, wherein:
the canopy is substantially symmetrically linked to the mold-support face sufficiently enough to substantially suppress deflection of the mold-support face responsive to a force acting to deflect the mold-support face.

15. A method of stiffening a molding-system platen, the method comprising:
linking to, and stiffening, a mold-support face with a canopy,
the mold-support face being configured to support a mold, the mold-support face including:
a frustum-shaped structure having a pedestal, the pedestal being centrally positioned relative to the mold-support face, and the pedestal being offset rearward of the mold-support face, and the pedestal defining a force-receiving face being offset rearward from the mold-support face, and the force-receiving face being smaller than the mold-support face;
a border surrounding the mold-support face, and a width of the border extending from an outer edge of the mold-support face toward the outer edge of the force-receiving face;
an upstanding wall extending posterior of the mold-support face; and
a peripheral wall extending around a periphery of the mold-support face; and
the canopy linking to, and stiffening, the mold-support face and the border, the canopy being suspended over and covering, at least in part, a posterior of the mold-support face, and the canopy being positioned between the mold-support face and the force-receiving face, the canopy being attached to the upstanding wall, and the upstanding wall linking the canopy to the mold-support face, the canopy attaching with the peripheral wall, the canopy attaching with the upstanding wall.

16. The method of claim 15, further comprising:
linking the canopy to a posterior of the mold-support face.

17. The method of claim 15, further comprising:
using the canopy to improve a moment of inertia of the mold-support face sufficiently enough to substantially suppress deflection of the mold-support face responsive to a force acting to deflect the mold-support face.

18. The method of claim 15, further comprising:
positioning the canopy offset rearward proximate of the mold-support face sufficiently enough to substantially suppress deflection of the mold-support face responsive to a force acting to deflect the mold-support face.

19. The method of claim 15, further comprising:
having the canopy include a planar surface, the planar surface is sufficiently large enough to substantially suppress deflection of the mold-support face responsive to a force acting to deflect the mold-support face.

20. The method of claim 15, further comprising:
having the canopy include a mass, and the mass is substantial enough to suppress deflection of the mold-support face responsive to a force acting to deflect the mold-support face.

21. The method of claim 15, further comprising:
substantially symmetrically linking the canopy to the mold-support face sufficiently enough to substantially suppress deflection of the mold-support face responsive to a force acting to deflect the mold-support face.

* * * * *